(12) United States Patent
Hua et al.

(10) Patent No.: US 9,887,796 B2
(45) Date of Patent: Feb. 6, 2018

(54) METHOD FOR CONFIGURING A NODE, DEVICE AND SYSTEM

(71) Applicant: ZTE Corporation, Shenzhen, Guangdong (CN)

(72) Inventors: Feng Hua, Shenzhen (CN); Huitao Wang, Shenzhen (CN); Bailin Shen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 14 days.

(21) Appl. No.: 15/023,040

(22) PCT Filed: May 20, 2014

(86) PCT No.: PCT/CN2014/077942
§ 371 (c)(1),
(2) Date: Mar. 18, 2016

(87) PCT Pub. No.: WO2015/039454
PCT Pub. Date: Mar. 26, 2015

(65) Prior Publication Data
US 2016/0226619 A1    Aug. 4, 2016

(30) Foreign Application Priority Data
Sep. 23, 2013 (CN) .......................... 2013 1 0435769

(51) Int. Cl.
*H04J 14/02* (2006.01)
*H04L 12/24* (2006.01)
*H04B 10/27* (2013.01)

(52) U.S. Cl.
CPC .......... *H04J 14/0278* (2013.01); *H04B 10/27* (2013.01); *H04L 41/0803* (2013.01); *H04J 14/02* (2013.01)

(58) Field of Classification Search
CPC ............ H04J 14/0227; H04Q 11/0062; H04Q 11/0066; H04Q 2011/0064
(Continued)

(56) References Cited

U.S. PATENT DOCUMENTS

2009/0207896 A1* 8/2009 Behzad ................ H04B 1/0475
375/221
2012/0068822 A1* 3/2012 Sheikman ................ G01S 5/00
340/7.2
(Continued)

FOREIGN PATENT DOCUMENTS

CN    1728604 A    2/2006
CN    102143052 A   8/2011
(Continued)

OTHER PUBLICATIONS

Feng Hua, English translation of CN 102624479, Nov. 7, 2016, 5 pages.*
(Continued)

*Primary Examiner* — Don N Vo
(74) *Attorney, Agent, or Firm* — Cooper Legal Group, LLC

(57) ABSTRACT

The present disclosure discloses a method for configuring a node, device and system. The method includes that: a sending node encapsulates configuration information in a wavelength label information frame, wherein the configuration information is configured to configure a downstream node; and the sending node loads the wavelength label information frame to an optical signal, and sends the wavelength label information frame and the optical signal.

18 Claims, 4 Drawing Sheets

(58) Field of Classification Search
USPC .......................................................... 398/79
See application file for complete search history.

(56) References Cited

U.S. PATENT DOCUMENTS

| | | |
|---|---|---|
| 2013/0101292 A1 | 4/2013 | Lanzone |
| 2013/0243427 A1 | 9/2013 | Lin |
| 2013/0330079 A1* | 12/2013 | Kauffeldt ............ H04J 14/0275 |
| | | 398/79 |

FOREIGN PATENT DOCUMENTS

| | | |
|---|---|---|
| CN | 102624479 A | 8/2012 |
| WO | 2013056739 A1 | 4/2013 |
| WO | 2013143420 A1 | 10/2013 |

OTHER PUBLICATIONS

International Search Report in international application No. PCT/CN2014/077942, dated Jul. 23, 2014, 2 pgs.
English Translation of the Written Opinion of the International Search Authority in international application No. PCT/CN2014/077942, dated Jul. 23, 2014, 9 pgs.
Supplementary European Search Report in European application No. 14845827.6, dated Aug. 11, 2016, 7 pgs.

* cited by examiner

METHOD FOR CONFIGURING A NODE, DEVICE AND SYSTEM

TECHNICAL FIELD

The present disclosure relates to an optical transport technology in the field of communication, and in particular to a method for configuring a node, device and system.

BACKGROUND

A multicarrier optical transmission technology, a flexible grid technology and a coherent Digital Signal Processing (DSP) technology are introduced into an ultra-100G optical transport system, thereby meeting requirements of wave division multiplexing transport of different modulation formats and different rates, and moreover, configurability and programmability are achieved. In an ultra-100G optical transport system age, a system may perform spectrum resource allocation and optimization to implement spectrum defragmentation and increase a spectrum utilization rate according to a spectrum resource utilization condition and line damage of the whole network, and this also means that a spectrum resource configuration of the system is not fixed any longer, and is required to be changed according to a change in a modulation format, subcarrier multiplexing manner and spectrum occupation condition of a sending node of the system.

At present, a configuration method for the abovementioned ultra-100G optical transport system includes that: configuration information is transmitted to each node of the system through a network manager, and when a sending side configuration, such as a modulation format and a subcarrier multiplexing manner, of a line side sending node of the system is changed by the network manager according to a state of a link, the network manager is also required to change configurations of each Reconfigurable Optical Add Drop Multiplexer (ROADM) node in the link and a receiver. For example, when the sending side configuration, such as the modulation format and the subcarrier multiplexing manner, of the line side sending node is changed by the network manager according to the state of the link, it is necessary to change the configurations of each downstream ROADM node in the link and the receiver; or, when the ultra-100G optical transport system performs flexible grid spectrum optimization, a spectrum occupation condition of a signal may change, and it is necessary to reconfigure the sending node, downstream ROADM nodes and receiver of the optical transport system. However, when a configuration workload increases, configuration through the network manager is low in efficiency and high in error rate.

SUMMARY

In view of this, the embodiments of the present disclosure provide a method, device and system for configuring a node.

The present disclosure provides a method for configuring a node, which may include that:

a sending node encapsulates configuration information in a wavelength label information frame, wherein the configuration information may be configured to configure a downstream node; and the sending node loads the wavelength label information frame to an optical signal, and sends the wavelength label information frame and the optical signal.

In the solution, the configuration information may include a subcarrier multiplexing manner, a signal rate and a modulation format of the optical signal of the sending node, and a spectrum resource occupied by the optical signal;

the encapsulation may include that: a frame header and a frame body are added according to a preset frame format respectively, the frame body including the subcarrier multiplexing manner, the signal rate and the modulation format of the optical signal, the spectrum resource occupied by the optical signal and an extended field.

In the solution, after the step that the sending node encapsulates the configuration information in the wavelength label information frame, the method may further include that: the wavelength label information frame is coded according to a preset coding rule.

In the solution, the step that the wavelength label information frame is loaded to the optical signal may include that: a low-frequency perturbation modulation frequency corresponding to the optical signal is determined according to the optical signal corresponding to the wavelength label information frame, the coded wavelength label information frame is modulated to the low-frequency perturbation modulation frequency, and the low-frequency perturbation signal is loaded to the optical signal.

The present disclosure further provides a method for configuring a node, which may include that:

a downstream node extracts a wavelength label information frame from a received optical signal, and decodes the wavelength label information frame to obtain configuration information; and the downstream node performs adaptive configuration according to the configuration information.

In the solution, after the step that the downstream node performs adaptive configuration according to the configuration information, the method may further include that: the downstream node reports a current configuration condition to a network manager after the adaptive configuration.

In the solution, the step that the downstream node extracts the wavelength label information frame from the received optical signal may include that: photoelectric conversion is performed on the received optical signal; frequency analysis is performed on the optical signal subjected to the photoelectric conversion to obtain bit information in the optical signal; and the bit information is decoded to obtain the wavelength label information frame according to a preset decoding rule.

In the solution, the step that photoelectric conversion is performed on the received optical signal may include that: the downstream node performs light splitting on the received optical signal through a coupler, and extracts and subjects a part of light-split signal obtained by the light splitting to photoelectric conversion, amplification, sampling and analogue-digital conversion.

In the solution, the step that the bit information is decoded to obtain the wavelength label information frame may include that: the bit information is searched for a special bit sequence corresponding to a frame header according to the preset decoding rule; and frame data after the frame header is decoded to obtain the wavelength label information frame according to the preset decoding rule.

In the solution, the adaptive configuration may include that:

a grid width of a wavelength-selective switch is set according to a spectrum resource required by a corresponding optical signal;

a shape of a filter is set according to a subcarrier multiplexing manner and a modulation format of an optical signal; and a DSP algorithm adopted for a receiver is set according to a modulation format, a multiplexing manner and a rate of the corresponding optical signal.

The present disclosure further provides a sending node, which may include an encapsulation unit and a loading unit, wherein the encapsulation unit may be configured to encapsulate configuration information in a wavelength label information frame, wherein the configuration information may be configured to configure a downstream node; and the loading unit may be configured to load the wavelength label information frame provided by the encapsulation unit to an optical signal, and send the wavelength label information frame and the optical signal.

In the solution, the configuration information may include a subcarrier multiplexing manner, a signal rate and a modulation format of the optical signal of the sending node, and a spectrum resource occupied by the optical signal; and the encapsulation may include that: a frame header and a frame body are added according to a preset frame format respectively, the frame body including the subcarrier multiplexing manner, the signal rate and the modulation format of the optical signal, the spectrum resource occupied by the optical signal and an extended field.

In the solution, the sending node may further include: a coding unit, configured to code the wavelength label information frame provided by the encapsulation unit according to a preset coding rule; and correspondingly, the encapsulation unit may be configured to provide the wavelength label information frame for the coding unit.

In the solution, the sending node may further include: a frequency generation unit and a modulation unit, wherein the frequency generation unit may be configured to determine a low-frequency perturbation modulation frequency corresponding to the optical signal according to the optical signal corresponding to the wavelength label information frame;

the modulation unit may be configured to modulate the coded wavelength label information frame provided by the coding unit to the low-frequency perturbation modulation frequency; and correspondingly, the loading unit may be configured to load the low-frequency perturbation signal to the optical signal.

The present disclosure further provides a downstream node, which may include a decoding unit and a configuration unit, wherein the decoding unit may be configured to extract a wavelength label information frame from a received optical signal, and decode the wavelength label information frame to obtain configuration information; and the configuration unit may be configured to perform adaptive configuration according to the configuration information.

In the solution, the downstream node may include a processing unit and a spectral analysis unit, wherein the processing unit may be configured to perform photoelectric conversion on the received optical signal;

the spectral analysis unit may be configured to perform frequency analysis on the optical signal subjected to the photoelectric conversion to obtain bit information in the optical signal, and send the bit information to the decoding unit; and correspondingly, the decoding unit may be configured to decode the bit information to obtain the wavelength label information frame according to a preset decoding rule.

In the solution, the downstream node may further include: a light splitting unit, configured to perform light splitting on the received optical signal through a coupler, and send a part of light-split signal obtained by the light splitting to the processing unit; and correspondingly, the processing unit may be configured to extract and subject the light-split signal to photoelectric conversion, amplification, sampling and analogue-digital conversion.

In the solution, the downstream node may further include a framing unit configured to acquire the configuration information from the wavelength label information frame; and correspondingly, the coding unit may further be configured to search the bit information for a special bit sequence corresponding to a frame header according to the preset decoding rule, and decode frame data after the frame header to obtain the wavelength label information frame.

In the solution, the adaptive configuration may include that:

a grid width of a wavelength-selective switch is set according to a spectrum resource required by a corresponding optical signal;

a shape of a filter is set according to a subcarrier multiplexing manner and a modulation format of an optical signal; and a DSP algorithm adopted for a receiver is set according to a modulation format, a multiplexing manner and a rate of the corresponding optical signal.

The present disclosure provides a system for configuring a node, which may include a sending node and at least one downstream node, wherein the sending node may be configured to encapsulate configuration information in a wavelength label information frame, load the wavelength label information frame to an optical signal, and send the wavelength label information frame and the optical signal, wherein the configuration information is configured to configure the downstream node; and the downstream node may be configured to extract the wavelength label information frame from the received optical signal, decode the wavelength label information frame to obtain the configuration information, and perform adaptive configuration according to the configuration information.

According to the method, device and system for configuring a node provided by the present disclosure, the sending node encapsulates configuration information in a wavelength label information frame, wherein the configuration information is configured to configure a downstream node; and the sending node loads the wavelength label information frame to an optical signal, and simultaneously sends the wavelength label information frame and the optical signal. Obviously, the sending node directly transmits the configuration information to the downstream node, and the downstream node performs decoding and adaptive configuration, so that low efficiency caused by sequential configuration of a network manager over each node is solved, and node configuration efficiency of an optical transmission system is further improved.

DETAILED DESCRIPTION

A basic thought of the embodiments of the present disclosure is that: a sending node encapsulates configuration information in a wavelength label information frame, wherein the configuration information is configured to configure a downstream node; and the sending node loads the wavelength label information frame to an optical signal, and sends the wavelength label information frame and the optical signal.

The present disclosure will be further described below with reference to the drawings and specific embodiments in detail.

Embodiment 1

Figure 1:
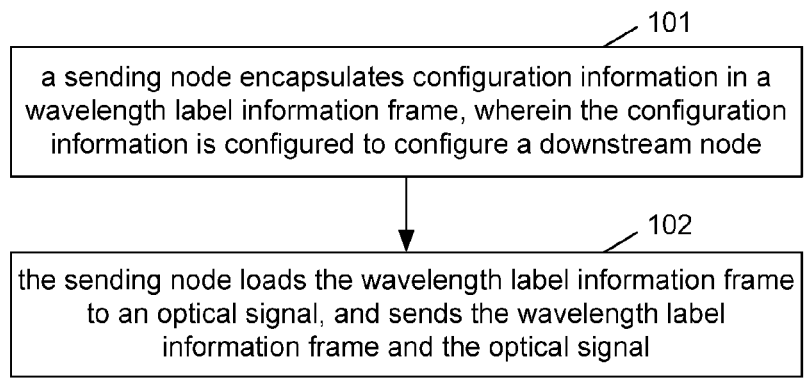
FIG. 1 is a flowchart of a sending node in a method for configuring a node according to embodiment 1 of the present disclosure.

The embodiment of the present disclosure provides an operation flow of a sending node in a method for configuring a node, which, as shown in FIG. 1, includes:

step 101: a sending node encapsulates configuration information in a wavelength label information frame, wherein the configuration information is configured to configure a downstream node; and step 102: the sending node loads the wavelength label information frame to an optical signal, and sends the wavelength label information frame and the optical signal.

The downstream node may be an ROADM node and a receiver.

Preferably, the configuration information includes, but not limited to: a subcarrier multiplexing manner, a signal rate and a modulation format of the optical signal of sending node, a spectrum resource occupied by the optical signal, and the like.

Here, the modulation format of the optical signal includes, but not limited to: Polarization Division Multiplexed Quadrature Phase Shift Keying (PDM-QPSK), 16 Quadrature Amplitude Modulation (16QAM), 32QAM, 64QAM and the like;

the subcarrier multiplexing manner includes, but not limited to: single-carrier and multicarrier Orthogonal Frequency Division Multiplexing (OFDM), multicarrier Nyquist and the like; and the spectrum resource occupied by the optical signal includes, but not limited to: the number of subcarriers in an optical channel, whether the subcarriers are continuous or not, a central frequency of each carrier/subcarrier, a bandwidth range and the like, wherein a granularity of the central frequency is 0.00625 THz, a calculation formula for a nominal central frequency is 193.1 THz+n×0.00625 THz, n is an integer (which may be negative), and a normal bandwidth is 12.5 GHz×m, wherein m is a positive integer.

Each optical channel may include one or more subcarriers, the subcarriers may be discontinuous, information of an optical channel may be encapsulated in a wavelength label when paths of each subcarrier in the optical channel are the same, and when paths of each subcarrier in an optical channel are different, each subcarrier is required to adopt different wavelength labels, and the wavelength labels include information of the current subcarriers.

Figure 2:
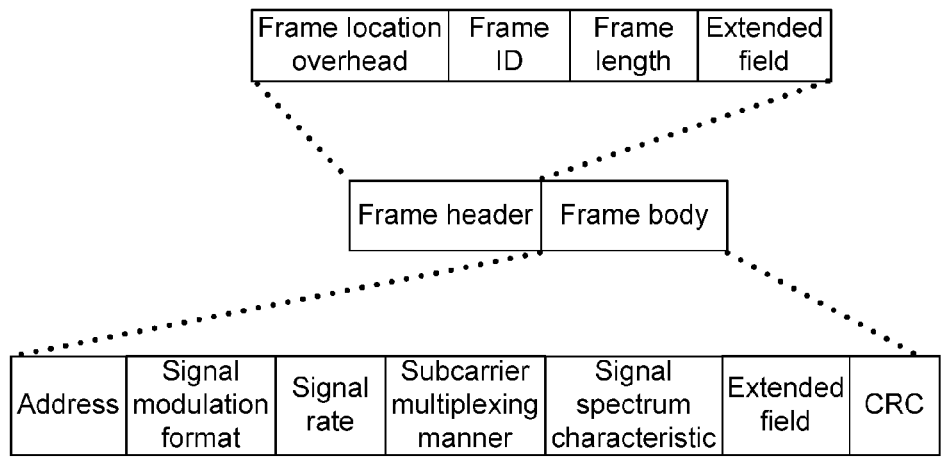
FIG. 2 is a structure diagram of a wavelength label information frame according to the present disclosure.

Preferably, the encapsulation is implemented as follows: a frame header and a frame body of a data frame and each field of the data frame are generated according to a preset frame format; the frame format may, as shown in FIG. 2, include the frame header and the frame body; and the frame header has a fixed length, the frame body has a variable length, and the length of the frame body is related to the actual number of subcarriers.

The frame header includes, but not limited to: frame location overhead, a frame Identifier (ID), a frame length and an extended field, wherein the frame location overhead is configured to define a starting position of the frame, and the frame ID serves as a serial number of the data frame; the frame length is configured to represent the length of the frame body of the data frame, define a length of the data frame and delimit a length of each field of the data frame, and the field is optional; and the extended field is configured for future extension.

The frame body includes a signal source address, a signal destination address, the signal modulation format, a sub-signal rate, a subcarrier multiplexing manner, the number of the subcarriers, serial numbers of the subcarriers, the central frequency of each subcarrier, a bandwidth of each subcarrier, the extended field and a Cyclic Redundancy Check (CRC), and is not limited to these fields.

Here, the signal source address represents a source node address of a signal;

the signal destination address represents a sending destination node address of the signal;

the signal modulation format includes PDM-QPSK, 16QAM, 32QAM, 64QAM and the like;

the signal rate refers to a signal rate of the optical channel, such as 100G, 400G and 1 T;

the subcarrier multiplexing manner includes single-carrier and multicarrier OFDM, multicarrier Nyquist and the like;

a spectrum characteristic of the signal refers to a distribution condition of the signal on a frequency spectrum, and includes the number of the subcarriers of the signal, whether the subcarriers are continuous or not, a central frequency and a bandwidth of each subcarrier and the like; and the extended field is configured for extension of the frame body, and if it is not intended to consider extension, then this field is optional.

The CRC implements simple CRC of a data frame, another error detection/error correction method may also be adopted, such as Forward Error Correction (FEC), and if it is not intended to consider check, then this field is optional.

Preferably, after step 101, the method may further include that: the wavelength label information frame is coded according to a preset coding rule.

For example, a frame body, except the frame header, of the wavelength label information frame may be coded according to the coding rule, wherein the coding rule may be as follows: a 4B/5B coding manner is adopted for coding, another coding manner such as 8B/10B and scrambling may also be adopted, and it is specified that no matter which coding manner is adopted, it is needed to satisfy that the part coded in the coding manner may be decoded.

Preferably, step 102 is specifically implemented as follows: a low-frequency perturbation modulation frequency corresponding to an optical signal wavelength is determined according to the optical signal wavelength corresponding to the wavelength label information frame, the coded wavelength label information frame is modulated to the low-frequency perturbation modulation frequency, the low-frequency perturbation signal is loaded to the corresponding optical signal, and the wavelength label information frame and the optical signal are sent.

Here, the operation that the coded wavelength label information frame is modulated to the low-frequency perturbation modulation frequency and is sent through the optical signal may be implemented as follows: the frequency is generated through a digital frequency synthesizer, the coded wavelength label information frame is modulated to the low-frequency perturbation modulation frequency, and a modulation manner may adopt amplitude modulation, or may also adopt another modulation manner such as frequency modulation; and a wavelength label loading device such as an adjustable optical attenuator is controlled by the modulated low-frequency perturbation signal to load the low-frequency perturbation signal to the corresponding optical signal for sending with a proper modulation depth (3%~8%, which may be set by experience or determined in a simulation manner).

Embodiment 2

Figure 3:
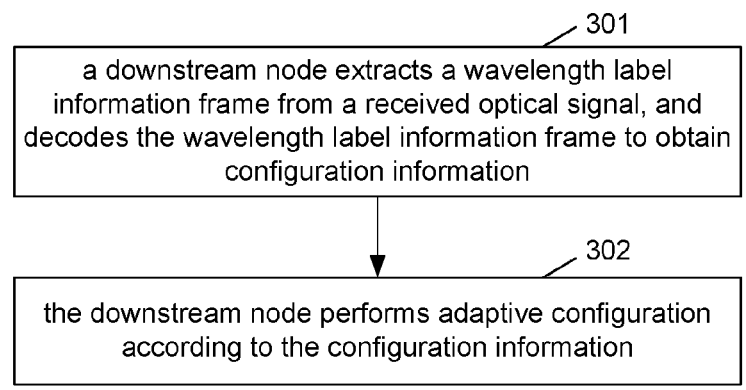
FIG. 3 is a flowchart of a downstream node in a method for configuring a node according to embodiment 2 of the present disclosure.

The embodiment of the present disclosure provides an operation flow of a downstream node in a method for configuring a node, which, as shown in FIG. 3, includes:

step 301: the downstream node extracts a wavelength label information frame from a received optical signal, and decodes the wavelength label information frame to obtain configuration information; and step 302: the downstream node performs adaptive configuration according to the configuration information.

The downstream node may be an ROADM node or a receiving node.

Preferably, after step 302, the downstream node may further report a current configuration condition to a network manager after adaptive configuration.

Preferably, the configuration information includes, but not limited to: a subcarrier multiplexing manner, a signal rate and a modulation format of the optical signal of a sending node, a spectrum resource occupied by the optical signal and the like.

Preferably, the step that the downstream node extracts the wavelength label information frame from the received optical signal includes that: photoelectric conversion is performed on the received optical signal; frequency analysis is performed on the optical signal subjected to the photoelectric conversion to obtain bit information in the optical signal; and the bit information is decoded to obtain the wavelength label information frame according to a preset decoding rule.

Here, the step that photoelectric conversion is performed on the received optical signal may include that: the downstream node performs light splitting on the received optical signal through a coupler, extracts a small part (for example, 5%) of the optical signal and subject this small part to photoelectric conversion, and then to amplification, sampling and analogue-digital conversion.

Frequency analysis may be implemented as follows: spectral analysis is performed on the sampled signal by Chirp Z Transformation (CZT), Fast Fourier Transform (FFT) or other methods, and a frequency value of a low-frequency perturbation frequency and the contained bit information are obtained according to a spectral analysis result.

The step that the bit information is decoded to obtain the wavelength label information frame may include that: the bit information is searched for a special bit sequence, which, for example, may be 0xF6F6F6282828, corresponding to a frame header according to the preset decoding rule; and frame data after the frame header is decoded to obtain the wavelength label information frame according to the preset decoding rule.

The step that the frame data after the frame header is decoded to obtain the wavelength label information frame may be implemented as follows: if a sender adopts data coded according to a 4B/5B coding rule, a corresponding 4B/5B decoding rule is adopted for decoding processing, and if a certain codeword is not in a 4B/5B coding table, it is determined that a decoding error occurs, the data frame is discarded, and the decoding error is reported; and if it is determined that there is no decoding error, framing is performed on the decoded data to obtain the wavelength label information frame. The wavelength label information frame is checked, and for a frame check byte generated by the sender through a CRC, frame check is performed according to a CRC rule, and if the data in the frame passes CRC, the frame header and a frame body are generated.

Here, the operation that the frame header and the frame body are generated may be implemented as follows: the frame header is generated at first, and information such as a frame location overhead, a frame ID, a frame length and an extended field is sequentially extracted; and then the frame body is generated, and effective field information such as an address, a signal modulation format, a signal rate, a subcarrier multiplexing mode, a signal spectrum characteristic, an extended field and a CRC is sequentially extracted.

When the information is extracted, an address offset manner is adopted, the information is sequentially extracted by bytes, and a corresponding frame field is formed every time when a field is extracted until framing is performed on all the fields.

On the contrary, a CRC error is reported, and the error frame is discarded. If the sender adopts FEC check, a receiver also adopts FEC check.

Adaptive configuration includes, but not limited to, that:

a grid width of a wavelength-selective switch is set according to a spectrum resource required by a corresponding optical signal;

a shape of a filter is set according to a subcarrier multiplexing manner and a modulation format of an optical signal; and a DSP algorithm adopted for a receiver is set according to a modulation format, a multiplexing manner and a rate of the corresponding optical signal.

Embodiment 3

Figure 4:
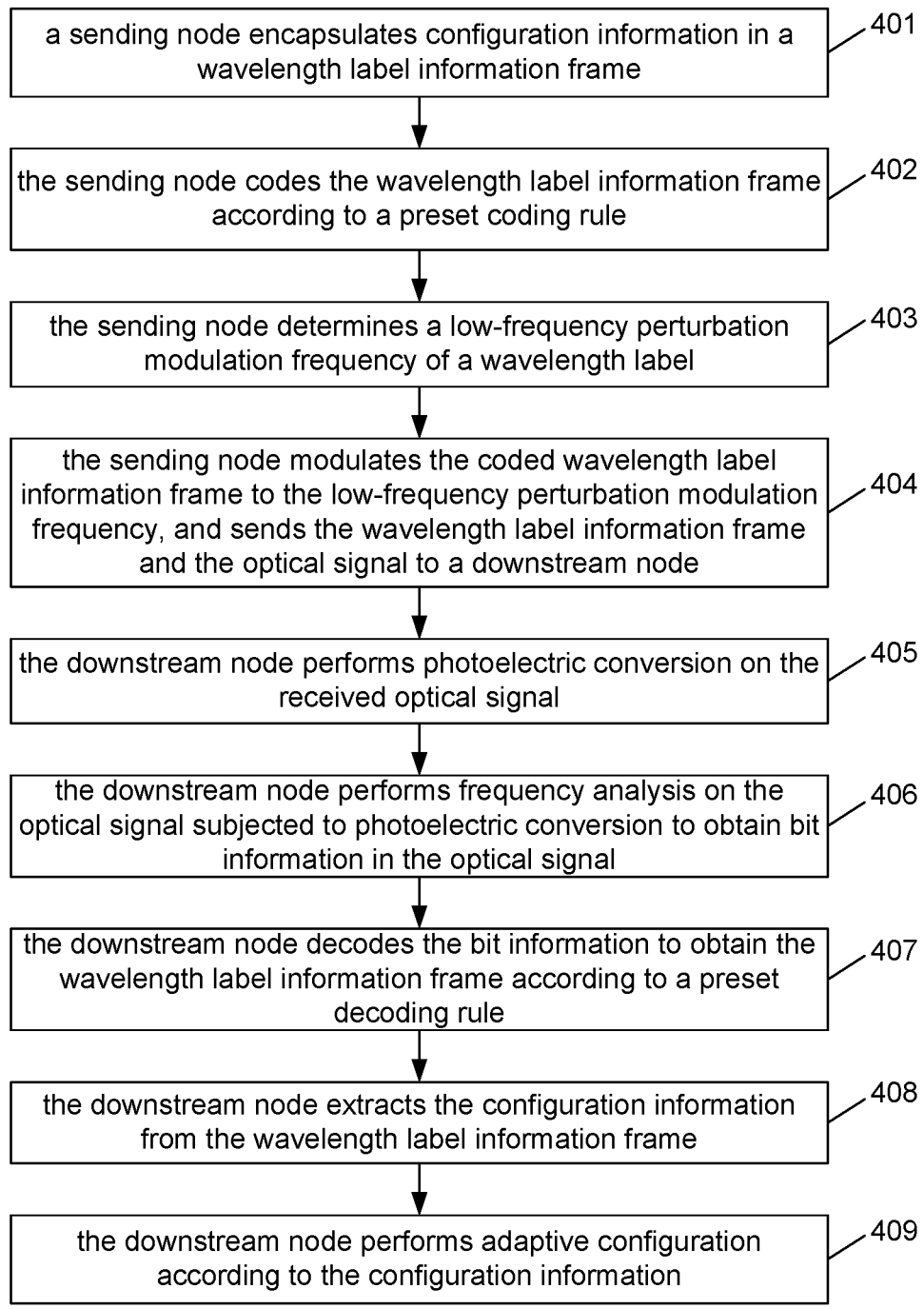
FIG. 4 is a flowchart of a method for configuring a node according to embodiment 3 of the present disclosure.

FIG. 4 is a method for configuring a node provided by an embodiment of the present disclosure, which includes the following steps.

Step 401: a sending node encapsulates configuration information in a wavelength label information frame.

Specifically, the sending node forms a frame at first, generates a frame header and a frame body of the data frame according to a format shown in FIG. 2, and generates each field of the data frame according to a rule.

Step 402: the sending node codes the wavelength label information frame according to a preset coding rule.

Specifically, bytes, i.e. a frame body, except the frame header, of the wavelength label information frame, are coded according to the coding rule, wherein a 4B/5B coding manner is adopted for coding the data frame, another coding manner such as 8B/10B and scrambling may also be adopted, and it is specified that no matter which coding manner is adopted, the part coded in the coding manner may be decoded.

Step 403: the sending node determines a low-frequency perturbation modulation frequency of a wavelength label.

Specifically, a low-frequency perturbation modulation frequency corresponding to a wavelength channel corresponding to the wavelength label information frame is determined according to the wavelength channel, the frequency may be generated through a digital frequency synthesizer, the coded wavelength label information frame is modulated to the low-frequency perturbation modulation frequency, and a modulation manner may be amplitude modulation, or may also be another modulation manner such as frequency modulation.

Step 404: the sending node modulates the coded wavelength label information frame to the low-frequency perturbation modulation frequency, and sends the wavelength label information frame and the optical signal to a downstream node.

A wavelength label loading device such as an adjustable optical attenuator is controlled by the modulated low-frequency perturbation signal to load the low-frequency perturbation signal to the corresponding wavelength channel with a proper modulation depth (3%~8%, which may be set by experience or determined in a simulation manner) and send the signal.

The downstream node may be an ROADM node or a receiving node.

Step 405: the downstream node performs photoelectric conversion on the received optical signal.

Photoelectric conversion may be implemented as follows: light splitting, photoelectric conversion, amplification and sampling are performed on the optical signal.

Light splitting may be extracting and sending a small part (for example, 5%) of the optical signal to a PIN receiver to subject the small part to photoelectric conversion and then to amplification, sampling and analogue-to-digital conversion.

Step 406: the downstream node performs frequency analysis on the optical signal subjected to photoelectric conversion to obtain bit information in the optical signal.

Specifically, spectral analysis is performed on the sampled signal by CZT, FFT or the like, a frequency value of a low-frequency perturbation frequency and the contained bit information are obtained according to a spectral analysis result, and wavelength channel information corresponding to the low-frequency perturbation frequency is recovered.

Step 407: the downstream node decodes the bit information to obtain the wavelength label information frame according to a preset decoding rule.

For example, the bit information obtained by spectral analysis is searched for a special bit sequence, which, for example, is 0xF6F6F6282828 here, corresponding to a frame header, and then decoding processing is performed on frame data after the frame header; and if a sender adopts data coded according to a 4B/5B coding rule, a corresponding 4B/5B decoding rule is adopted for decoding processing. If a certain codeword is not in a 4B/5B coding table, it is determined that an error occurs, the data frame is discarded, and the decoding error is reported. If there is no error during decoding, the decoded data is framed.

The framing and checking are performed on decoded information. For a frame check byte generated by the sender through a CRC, frame check is performed according to a CRC rule, and if the data in the frame passes CRC, the frame header and the frame body are generated.

The frame header is generated at first, and information such as a frame location overhead, a frame ID, a frame length and an extended field is sequentially extracted.

Then the frame body is generated, and effective field information such as an address, a signal modulation format, a signal rate, a subcarrier multiplexing mode, a signal spectrum characteristic, an extended field and a CRC is sequentially extracted.

When the information is extracted, an address offset manner is adopted, the information is sequentially extracted by bytes, and a corresponding frame field is formed every time when a field is extracted until framing is performed on all the fields.

On the contrary, a CRC error is reported, and the error frame is discarded. If the sender adopts FEC check, a receiver also adopts FEC check.

Step 408: the downstream node extracts the configuration information from the wavelength label information frame.

For example, the subcarrier multiplexing manner, the signal rate and the modulation format of the optical signal of the sending node, the spectrum resource occupied by the optical signal and the like may be extracted from the wavelength label information frame to form the configuration information according to a preset frame format shown in FIG. 2.

Preferably, the downstream node may further acquire its own required information from the configuration information.

Step 409: the downstream node performs adaptive configuration according to the configuration information.

Adaptive configuration includes, but not limited to, that:
the ROADM node sets a grid width of a wavelength-selective switch according to the spectrum resource required by the corresponding optical signal;
the ROADM node sets a shape of a filter according to a subcarrier multiplexing manner, a modulation format and the like of the optical signal; and
the receiver sets a DSP algorithm and the like adopted for the receiver according to a modulation format, a multiplexing manner and a rate of the corresponding optical signal and the like.

Embodiment 4

Figure 5:
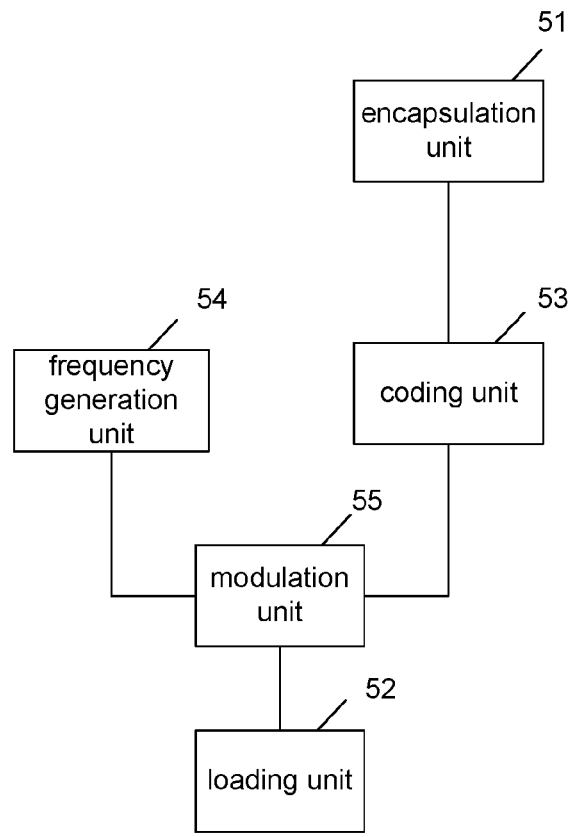
FIG. 5 is a structure diagram of a sending node according to embodiment 4 of the present disclosure.

FIG. 5 is a structure of a sending node according to an embodiment of the present disclosure, including an encapsulation unit 51 and a loading unit 52, wherein
the encapsulation unit 51 is configured to encapsulate configuration information in a wavelength label information frame, wherein the configuration information is configured to configure a downstream node; and
the loading unit 52 is configured to load the wavelength label information frame provided by the encapsulation unit 51 to an optical signal, and send the wavelength label information frame and the optical signal.

Preferably, the configuration information includes, but not limited to: a subcarrier multiplexing manner, a signal rate and a modulation format of the optical signal of the sending node, a spectrum resource occupied by the optical signal and the like.

Here, the modulation format of the optical signal includes, but not limited to: PDM-QPSK, 16QAM, 32QAM, 64QAM and the like;
the subcarrier multiplexing manner includes, but not limited to: single-carrier and multicarrier OFDM, multicarrier Nyquist and the like; and the spectrum resource occupied by the optical signal includes, but not limited to: the number of subcarriers in an optical channel, whether the subcarriers are continuous or not, a central frequency of each carrier/subcarrier, a bandwidth range and the like, wherein a granularity of the central frequency is 0.00625 THz, a calculation formula for a nominal central frequency is 193.1 THz+n×0.00625 THz, n is an integer (which may be negative), and a normal bandwidth is 12.5 GHz×m, wherein m is a positive integer.

Each optical channel may include one or more subcarriers, the subcarriers may be discontinuous, information of an optical channel may be encapsulated in a wavelength label when paths of each subcarrier in the optical channel are the same, and when paths of each subcarrier in an optical channel are different, each subcarrier is required to adopt different wavelength labels, and the wavelength labels include information of the current subcarriers.

Preferably, the encapsulation unit 51 is configured to generate a frame header and a frame body of a data frame and generate each field of the data frame according to a preset frame format; the frame format may, as shown in FIG. 2, include the frame header and the frame body; and the frame header has a fixed length, the frame body has a variable length, and the length of the frame body is related to the actual number of subcarriers.

The frame header includes, but not limited to: a frame location overhead, a frame ID, a frame length and an extended field, wherein the frame location overhead is configured to define a starting position of the frame, and the frame ID serves as a serial number of the data frame; the frame length is configured to represent the length of the frame body of the data frame, is configured to define a length of the data frame and delimit a length of each field of the data frame, and the field is optional; and the extended field is configured for future extension.

The frame body includes: a signal source address, a signal destination address, a signal modulation format, a sub-signal rate, a subcarrier multiplexing manner, the number of the subcarriers, serial numbers of the subcarriers, the central frequency of each subcarrier, a bandwidth of each subcarrier, an extended field and a CRC, and is not limited to these fields.

Here, the signal source address represents a source node address of the signal;

the signal destination address represents a sending destination node address of the signal;

the signal modulation format includes PDM-QPSK, 16QAM, 32QAM, 64QAM and the like;

the signal rate refers to a signal rate of the optical channel, such as 100G, 400G and 1 T;

the subcarrier multiplexing manner includes single-carrier and multicarrier OFDM, multicarrier Nyquist and the like;

a spectrum characteristic of the signal refers to a distribution condition of the signal on a frequency spectrum, and includes the number of the subcarriers of the signal, whether the subcarriers are continuous or not, a central frequency and bandwidth of each subcarrier and the like; and the extended field is configured for extension of the frame body, and if it is not intended to consider extension, then this field is optional.

The CRC implements simple CRC of the data frame, another error detection/error correction method may also be adopted, such as FEC, and if it is not intended to consider check, then this field is optional.

Preferably, the sending node may further include: a coding unit 53, configured to code the wavelength label information frame provided by the encapsulation unit 51 according to a preset coding rule.

For example, a frame body, except the frame header, of the wavelength label information frame may be coded according to the coding rule, wherein the coding rule may be as follows: a 4B/5B coding manner is adopted for coding, another coding manner such as 8B/10B and scrambling may also be adopted, and it is specified that no matter which coding manner is adopted, the part coded in the coding manner may be decoded.

Preferably, the sending node may further include a frequency generation unit 54 and a modulation unit 55, wherein the frequency generation unit 54 is configured to determine a low-frequency perturbation modulation frequency corresponding to a wavelength label; the modulation unit 55 is configured to modulate the coded wavelength label information frame provided by the coding unit 53 to the low-frequency perturbation modulation frequency; and correspondingly, the loading unit 52 is configured to load and send the wavelength label information frame and the optical signal.

The frequency generation unit 54 is configured to generate the low-frequency perturbation frequency corresponding to a wavelength channel of the wavelength label information frame.

The frequency generation unit 54 determines the corresponding low-frequency perturbation frequency according to wavelength information of a wavelength signal, and then controls a digital frequency synthesizer to generate the low-frequency frequency.

The modulation unit 55 is configured to modulate the wavelength label information frame to the low-frequency perturbation frequency, and modulate the coded or uncoded wavelength label information frame to the low-frequency perturbation frequency in an amplitude modulation manner, wherein the modulation manner may also be another modulation manner such as frequency modulation.

The loading unit 52 is configured to load the modulated wavelength label information frame to the wavelength channel for sending, load the modulated signal to a wavelength channel signal with a proper modulation depth, and control stability of the modulation depth, wherein a device such as an adjustable optical attenuator may be controlled by the modulated signal for implementation.

Preferably, the frequency generation unit 54 may be implemented by a frequency synthesizer, and for example, the frequency is generated through the digital frequency synthesizer. The encapsulation unit, the loading unit and the modulation unit may all be implemented by hardware such as a digital signal processor or a Central Processing Unit (CPU).

Embodiment 5

Figure 6:
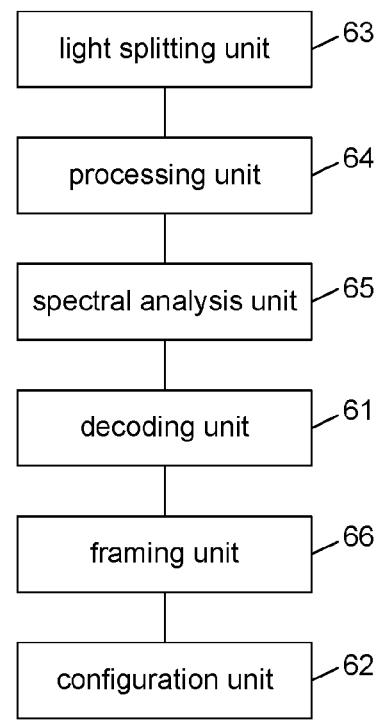
FIG. 6 is a structure diagram of a downstream node according to embodiment 5 of the present disclosure.

FIG. 6 is a structure diagram of a downstream node provided by the present disclosure, including a decoding unit 61 and a configuration unit 62, wherein the decoding unit 61 is configured to extract a wavelength label information frame from a received optical signal, and decode the wavelength label information frame to obtain configuration information; and the configuration unit 62 is configured to perform adaptive configuration according to the configuration information.

The downstream node may further include a light splitting unit 63 and a processing unit 64, wherein the light splitting unit 63 is configured to perform light splitting on the received optical signal; and the processing unit 64 is configured to perform photoelectric conversion on the optical signal sent by the light splitting unit 63.

Here, the light splitting unit 63 may be formed by an optical fibre coupler, and 5% of optical power is extracted for detection and reception of a wavelength label.

The processing unit 64 is configured to perform photoelectric conversion and analogue-to-digital conversion on a path of the optical signal (for example, 5% of the whole optical signal).

The processing unit 64 may be implemented by a photoelectric conversion-related PIN tube, an amplifier, an Analogue-to-Digital Converter (ADC) or the like. For example, one branch of the optical signal is extracted and sent to the PIN tube to subject to photoelectric conversion and then to amplification (through the amplifier), sampling and analogue-to-digital conversion (specifically through the ADC).

The downstream node may further include: a spectral analysis unit 65, configured to perform frequency analysis on the optical signal subjected to photoelectric conversion of the processing unit 64 to obtain bit information in the optical signal.

The spectral analysis unit 65 is configured to perform spectral analysis to obtain a frequency value of a low-frequency perturbation frequency and information of a frequency signal amplitude in the signal by CZT, and recover wavelength information corresponding to the frequency of the low-frequency perturbation frequency and the bit information thereof.

The decoding unit 61 is configured to decode the bit information obtained by the spectral analysis unit 65 to obtain the wavelength label information frame according to a preset decoding rule.

The decoding unit 61 is configured to search a code stream signal for a frame header, the frame header being 0xF6F6F6282828 in the example, and then perform 4B/5B decoding on frame data after the frame header. During decoding, if a codeword is not in a 4B/5B coding table, that is, an error occurs, the frame data is discarded, and the decoding error is reported.

The downstream node may further include: a framing unit 66, configured to acquire the configuration information from the wavelength label information frame acquired by the decoding unit 61, and send the configuration information to the configuration unit 62.

When there is no error during decoding, the framing unit 66 frames the decoded data, forms one frame consisting of the 4B/5B decoded data, performs CRC, and if there is an error, reports a CRC error.

The configuration unit 62 is configured to extract an address, a signal modulation format, a signal rate, a subcarrier multiplexing manner, a signal spectrum characteristic, an extended field and the like in the frame data, and perform adaptive configuration on the ROADM node and the receiver according to the information, including that:

a grid width of a wavelength-selective switch of the ROADM node is set according to a spectrum resource required by the corresponding optical signal; a shape of a filter of the wavelength-selective switch of the ROADM node is set according to the modulation format and subcarrier multiplexing manner and the like of the optical signal; and a DSP algorithm adopted for a receiver and the like are set according to the multiplexing manner, the modulation format, the rate of the corresponding optical signal and the like.

Functions realized by each of the abovementioned units may be understood with reference to related description in the abovementioned wavelength label transmission method, may be realized by a program running on a processor, and may also be realized by a specific logic circuit. The decoding unit 61, the configuration unit 62, the processing unit 64, the spectral analysis unit 65 and the framing unit 66 may all be implemented by hardware such as a digital signal processor or a CPU, and the light splitting unit 63 may be implemented by a light splitter.

Embodiment 6

Figure 7:
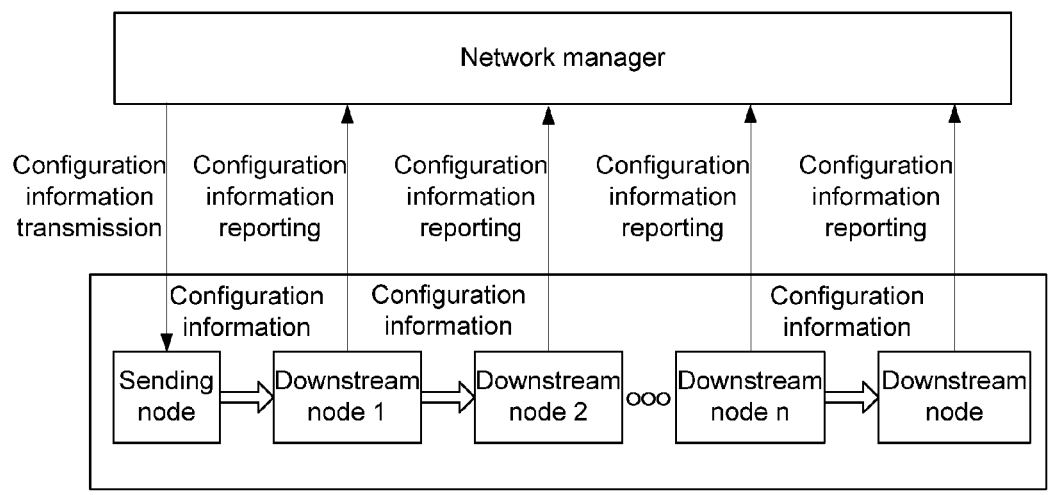
FIG. 7 is a structure diagram of a system for configuring a node according to embodiment 6 of the present disclosure.

A structure of a system for configuring a node provided by the embodiment of the present disclosure may, as shown in FIG. 7, include a sending node and at least one downstream node, wherein the sending node is configured to encapsulate configuration information into a wavelength label information frame, load the wavelength label information frame to an optical signal, and send the wavelength label information frame through the optical signal, wherein the configuration information is for configuring the downstream node; and the downstream node is configured to extract the wavelength label information frame from the received optical signal, decode the wavelength label information frame to obtain the configuration information, and perform adaptive configuration according to the configuration information.

Preferably, the system may further include: a network manager, configured to receive a current configuration condition reported by the downstream node, and correspondingly, the downstream node is configured to report the current configuration condition to the network manager after the adaptive configuration.

The above are only the preferred embodiments of the present disclosure and not intended to limit the scope of protection of the present disclosure.

What is claimed is:

1. A method for configuring a node, comprising:
encapsulating, by a sending node, configuration information in a wavelength label information frame, wherein a downstream node performs adaptive configuration according to the configuration information;
loading, by the sending node, the wavelength label information frame to an optical signal; and
sending the wavelength label information frame and the optical signal;
wherein the adaptive configuration comprises:
setting a grid width of a wavelength-selective switch according to a spectrum resource required by the optical signal;
setting a shape of a filter according to a subcarrier multiplexing manner and a modulation format of the optical signal; and
setting a Digital Signal Processing (DSP) algorithm adopted for a receiver according to the modulation format, a multiplexing manner and a signal rate of the optical signal.

2. The method according to claim 1, wherein the configuration information comprises: the subcarrier multiplexing manner, the signal rate and the modulation format of the optical signal, and the spectrum resource required by the optical signal; and the encapsulation comprises: adding a frame header and a frame body according to a preset frame format respectively, the frame body comprising the subcarrier multiplexing manner, the signal rate and the modulation format of the optical signal, the spectrum resource required by the optical signal and an extended field.

3. The method according to claim 1, after encapsulating, by the sending node, the configuration information in the wavelength label information frame, the method further comprising: coding the wavelength label information frame according to a preset coding rule.

4. The method according to claim 3, wherein loading the wavelength label information frame to the optical signal comprises: determining a low-frequency perturbation modulation frequency corresponding to the optical signal according to the wavelength label information frame, modulating the coded wavelength label information frame to the low-frequency perturbation modulation frequency to generate a low-frequency perturbation signal, and loading the low-frequency perturbation signal to the optical signal.

5. A method for configuring a node, comprising:
extracting, by a downstream node, a wavelength label information frame from a received optical signal, and decoding the wavelength label information frame to obtain configuration information; and
performing, by the downstream node, adaptive configuration according to the configuration information; wherein the adaptive configuration comprises:
setting a grid width of a wavelength-selective switch according to a spectrum resource required by the received optical signal;
setting a shape of a filter according to a subcarrier multiplexing manner and a modulation format of the received optical signal; and
setting a Digital Signal Processing (DSP) algorithm adopted for a receiver according to the modulation format, a multiplexing manner and a signal rate of the received optical signal.

6. The method according to claim 5, after performing, by the downstream node, adaptive configuration according to the configuration information, the method further comprising: reporting, by the downstream node, a current configuration condition to a network manager after the adaptive configuration.

7. The method according to claim 6, wherein extracting, by the downstream node, the wavelength label information frame from the received optical signal comprises:
performing photoelectric conversion on the received optical signal;
performing frequency analysis on the received optical signal subjected to the photoelectric conversion to obtain bit information in the received optical signal; and
decoding the bit information to obtain the wavelength label information frame according to a preset decoding rule.

8. The method according to claim 5, wherein extracting, by the downstream node, the wavelength label information frame from the received optical signal comprises:
performing photoelectric conversion on the received optical signal;
performing frequency analysis on the received optical signal subjected to the photoelectric conversion to obtain bit information in the received optical signal; and
decoding the bit information to obtain the wavelength label information frame according to a preset decoding rule.

9. The method according to claim 8, wherein performing photoelectric conversion on the received optical signal comprises:
performing, by the downstream node, light splitting on the received optical signal through a coupler, and performing photoelectric conversion, amplification, sampling and analogue-to-digital conversion on a part of a light-split signal obtained by the light splitting.

10. The method according to claim 8, wherein decoding the bit information to obtain the wavelength label information frame comprises:
searching the bit information for a special bit sequence corresponding to a frame header according to the preset decoding rule; and decoding frame data after the frame header to obtain the wavelength label information frame according to the preset decoding rule.

11. A sending node, comprising an encapsulation unit and a loading unit, wherein
the encapsulation unit is configured to encapsulate configuration information in a wavelength label information frame, wherein a downstream node performs adaptive configuration according to the configuration information; and
the loading unit is configured to load the wavelength label information frame provided by the encapsulation unit to an optical signal, and send the wavelength label information frame and the optical signal;
wherein the adaptive configuration comprises:
setting a grid width of a wavelength-selective switch according to a spectrum resource required by the optical signal;
setting a shape of a filter according to a subcarrier multiplexing manner and a modulation format of the optical signal; and
setting a Digital Signal Processing (DSP) algorithm adopted for a receiver according to the modulation format, a multiplexing manner and a signal rate of the optical signal.

12. The sending node according to claim 11, wherein the configuration information comprises: the subcarrier multiplexing manner, the signal rate and the modulation format of the optical signal, and the spectrum resource required by the optical signal; and
the encapsulation comprises: adding a frame header and a frame body according to a preset frame format respectively, the frame body comprising the subcarrier multiplexing manner, the signal rate and the modulation format of the optical signal, the spectrum resource required by the optical signal and an extended field.

13. The sending node according to claim 12, further comprising a coding unit configured to code the wavelength label information frame provided by the encapsulation unit according to a preset coding rule;
correspondingly, the encapsulation unit is configured to provide the wavelength label information frame for the coding unit.

14. The sending node according to claim 13, further comprising a frequency generation unit and a modulation unit, wherein
the frequency generation unit is configured to determine a low-frequency perturbation modulation frequency corresponding to the optical signal according the wavelength label information frame;

the modulation unit is configured to modulate the coded wavelength label information frame provided by the coding unit to the low-frequency perturbation modulation frequency to generate a low-frequency perturbation signal; and correspondingly, the loading unit is configured to load the low-frequency perturbation signal to the optical signal.

15. A downstream node, comprising:

a decoding unit, configured to extract a wavelength label information frame from a received optical signal, and decode the wavelength label information frame to obtain configuration information; and a configuration unit, configured to perform adaptive configuration according to the configuration information;

wherein the configuration unit is further configured to
- set a grid width of a wavelength-selective switch according to a spectrum resource required by the received optical signal;
- set a shape of a filter according to a subcarrier multiplexing manner and a modulation format of the received optical signal; and
- set a Digital Signal Processing (DSP) algorithm adopted for a receiver according to the modulation format, a multiplexing manner and a signal rate of the received optical signal.

16. The downstream node according to claim 15, further comprising:

a processing unit, configured to perform photoelectric conversion on the received optical signal; and a spectral analysis unit, configured to perform frequency analysis on the received optical signal subjected to the photoelectric conversion to obtain bit information in the received optical signal, and send the bit information to the decoding unit;

correspondingly, the decoding unit is configured to decode the bit information to obtain the wavelength label information frame according to a preset decoding rule.

17. The downstream node according to claim 16, further comprising a light splitting unit configured to perform light splitting on the received optical signal through a coupler, and send a part of a light-split signal obtained by the light splitting to the processing unit;

correspondingly, the processing unit is configured to perform photoelectric conversion, amplification, sampling and analogue-to-digital conversion on the part of the light-split signal.

18. The downstream node according to claim 17, further comprising a framing unit, configured to acquire the configuration information from the wavelength label information frame;

correspondingly, the decoding unit is configured to search the bit information for a special bit sequence corresponding to a frame header according to the preset decoding rule, and decode frame data after the frame header to obtain the wavelength label information frame.

* * * * *